Patented Sept. 20, 1932

1,878,185

UNITED STATES PATENT OFFICE

FRITZ ROTHE AND HANS BRENEK, OF BERLIN, GERMANY, ASSIGNORS TO THE FIRM RHENANIA-KUNHEIN VEREIN CHEMISCHER FABRIKEN AKTIENGESELLSCHAFT, OF BERLIN, GERMANY

PROCESS FOR OBTAINING FERTILIZERS

No Drawing. Original application filed June 28, 1927, Serial No. 202,156, and in Germany June 28, 1926. Divided and this application filed April 17, 1928. Serial No. 270,790.

The invention has reference to a process for obtaining fertilizers from crude phosphates with utilization of sodium chlorides. As sodium chloride represents a relatively cheap sodium-compound, its utilization renders the process quite economical. Furthermore it is thereby possible to obtain hydrochloric acid as by-product.

According to the invention a mixture containing crude phosphates, sodium chloride and silica in such quantity that ½ molecule of silica corresponds to one molecule of $P_2O_5$, is subjected to a heating treatment, preferably at a temperature of at least 900° C. in the presence of steam. At such a treatment the silica is thought to withdraw one molecule of CaO from the calciumphosphate so that in the case of tricalciumphosphate alkalidicalciumphosphate on the one hand and calciumorthosilicate on the other hand are formed.

It is of special importance that such lime present in the mixture which is not bound to the phosphoric acid is converted into calciumorthosilicate by silica. For this reason if the phosphorites to be treated contain lime not bound to phosphoric acid originally, for instance in the form of calciumcarbonate or calciumfluoride, then it is necessary to add further quantities of silica in excess of ½ molecule for every molecule of $P_2O_5$ so that in every case two molecules of CaO correspond to one molecule of $SiO_2$.

In this respect it must be pointed out, however, that any amounts of iron or alumina which may be contained in the phosphorites used for this process can replace the silica and can form with CaO calciumaluminate or calciumferrite. Any amounts of such materials therefore must be considered on calculating the required composition of the mixture to be heated.

Preferred temperatures for the described process are between 900° and 1200° centigrade.

The product obtained by the process herein described has a very high content of total phosphoric acid and also of citrate soluble phosphoric acid. It is a special advantage of this process, that the amount of silica added to the mixture is considerably lowered compared with former similar processes which made use of silica at the manufacture of fertilizers from crude phosphates.

Example 100 parts of a North African phosphate, containing 39.7% of $P_2O_5$, 47,0% of CaO bound to $P_2O_5$, 5,6% of CaO not bound to $P_2O_5$ and 0.56% of $SiO_2$ are mixed with 11,5 parts of quartz and 33 parts of technical sodium chloride and heated at a temperature of about 1100° centigrade in the presence of steam. The total amount of $P_2O_5$ contained in the heating product are 31,99% and the product contains 31,28% of citrate soluble $P_2O_5$ (soluble in a citrate solution according to Petermann) that is to say 97,8% of the total amount of phosphoric acid have been rendered soluble. The heating product contains still only 0.11% of Cl.

What we claim and desire to secure by Letters Patent of the United States is:

1. A process for obtaining fertilizers comprising heating a mixture of phosphates with silica and sodiumchloride in the presence of steam, there being present for every molecule of $P_2O_5$ in the mixture, an amount of silica substantially equal to and not exceeding half a molecule.

2. A process for obtaining fertilizers comprising heating a mixture of phosphates with silica and sodiumchloride in the presence of steam, there being present for every molecule of $P_2O_5$ in the mixture an amount of silica substantially equal to and not exceeding half a molecule, care being taken for transforming the CaO not bound to phosphoric acid in an insoluble form.

3. A process for obtaining fertilizers comprising heating a mixture of phosphates with silica and sodiumchloride in the presence of steam to a temperature of at least 900° centigrade, there being present for every molecule of $P_2O_5$ in the mixture, an amount of silica substantially equal to and not exceeding half a molecule.

4. A process for obtaining fertilizers comprising heating a mixture of phosphates with silica and sodiumchloride in the presence of steam to a temperature between 900 and 1200° centigrade, there being present for every molecule of $P_2O_5$ in the mixture, an amount of silica substantially equal to and not exceeding half a molecule.

5. A process for obtaining fertilizers comprising heating a mixture of phosphates with silica and sodiumchloride in the presence of steam to a temperature of at least 900° centigrade, there being present for every molecule of $P_2O_5$ in the mixture, an amount of silica substantially equal to and not exceeding half a molecule and care being taken for transforming the CaO not bound to phosphoric acid into an insoluble form.

6. A process for obtaining fertilizers comprising heating a mixture of phosphates with silica and sodiumchloride in the presence of steam, there being present an amount of silica substantially equal to and not exceeding one half a molecule for every molecule of $P_2O_5$ and substantially one molecule of silica for two molecules of CaO.

HANS BRENEK.
FRITZ ROTHE.